US011194402B1

(12) United States Patent
Yang et al.

(10) Patent No.: US 11,194,402 B1
(45) Date of Patent: Dec. 7, 2021

(54) FLOATING IMAGE DISPLAY, INTERACTIVE METHOD AND SYSTEM FOR THE SAME

(71) Applicant: Lixel Inc., Taipei (TW)

(72) Inventors: Chun-Hsiang Yang, Hsinchu (TW); Kai-Chieh Chang, Kaohsiung (TW); Chih-Hung Ting, New Taipei (TW)

(73) Assignee: Lixel Inc., Taipei (TW)

( * ) Notice: Subject to any disclaimer, the term of this patent is extended or adjusted under 35 U.S.C. 154(b) by 0 days.

(21) Appl. No.: 16/886,785

(22) Filed: May 29, 2020

(51) Int. Cl.
| *G06F 3/01* | (2006.01) |
| *G02B 30/56* | (2020.01) |
| *H04N 13/302* | (2018.01) |
| *G02B 30/26* | (2020.01) |
| *G02B 30/00* | (2020.01) |
| *G06K 9/00* | (2006.01) |

(52) U.S. Cl.
CPC ............ *G06F 3/017* (2013.01); *G02B 30/00* (2020.01); *G02B 30/26* (2020.01); *G02B 30/56* (2020.01); *G06K 9/00355* (2013.01); *H04N 13/302* (2018.05)

(58) Field of Classification Search
CPC ......... G06F 3/017; G02B 30/26; G02B 30/00; G02B 30/56; H04N 13/302; G06K 9/00355
See application file for complete search history.

(56) References Cited

U.S. PATENT DOCUMENTS

| 2010/0271290 A1* | 10/2010 | Tomisawa | G02B 30/56 345/32 |
| 2016/0147308 A1* | 5/2016 | Gelman | G06F 3/017 345/156 |
| 2016/0364003 A1* | 12/2016 | O'Brien | G03H 1/0005 |
| 2017/0219838 A1* | 8/2017 | Yang | G02B 30/36 |
| 2018/0316911 A1 | 11/2018 | Ishida et al. | |
| 2019/0018364 A1* | 1/2019 | Kim | G03H 1/024 |
| 2019/0147665 A1* | 5/2019 | Banavara | G06F 3/0304 345/419 |
| 2020/0055397 A1 | 2/2020 | Zhao et al. | |

FOREIGN PATENT DOCUMENTS

| CN | 104714646 A | 6/2015 |
| TW | 201104494 A1 | 2/2011 |
| TW | 201248452 A1 | 12/2012 |

* cited by examiner

*Primary Examiner* — Brent D Castiaux
(74) *Attorney, Agent, or Firm* — Li & Cai Intellectual Property Office

(57) ABSTRACT

An interactive method using a floating image display and a system thereof are provided. The method is performed in the display apparatus. The display apparatus links to a computer system that executes a driver for establishing a communication interface there-between. In the method, the display apparatus receives image data from the computer system and floating image data can be obtained therefrom. The floating image display apparatus displays a floating image via a display panel after a conversion process. After that, a user can manipulate directly on the floating image by gesture. A procedure running in the display apparatus can determine an interactive instruction according to variations of three-dimensional coordinates. When the interactive instruction is transmitted to the computer system, a new image data is formed in response to the interactive instruction. The display apparatus then displays a new floating image after receiving new data.

19 Claims, 12 Drawing Sheets

FLOATING IMAGE DISPLAY, INTERACTIVE METHOD AND SYSTEM FOR THE SAME

FIELD OF THE DISCLOSURE

The disclosure is generally related to applications of floating image display technology, and more particularly to a floating image display, an interactive method performed by a computer system connected with the display, and a system thereof.

BACKGROUND OF THE DISCLOSURE

Most conventional stereoscopic displays use the principle of parallax that occurs to combine images with a displacement as viewed by two eyes of a user in the brain, so that a floating image with a depth is produced. The two images with a displacement are configured to be displayed on the stereoscopic display, and a user can wear a special device to enable viewing of the floating image when the two images are combined in the brain. The special device is such as red-cyan glasses, polarized glasses, shutter glasses or even a head-mounted display that allows the two images displayed on the display to be projected onto the two eyes of a user.

Further, a naked-eye stereoscopic display technology allows the images to be projected onto the two eyes of the user via a specific optical element disposed on the display. The optical element can be a lens or a raster that allows the user to perceive the floating image without need for special optical equipment.

Various conventional stereoscopic display technologies are generally only technologies for displaying, but not technologies allowing the user to interact with the floating image. One of the reasons that there is no interactive technology for the conventional stereoscopic display is that the conventional stereoscopic display technologies produce images that are combined as a virtual image only in the brain, such that it is not possible for the user to interact with the virtual image.

For implementing image interaction, a user may perform a gesture on a capacitive touch display or a resistive touch display and the gesture can be sensed by the touch-sensitive display. The user uses the gesture to conduct interaction through the touch-sensitive technology. A software procedure is used to display an image in response to the gesture. The interactive behavior is such as an action of lateral and/or rotating movement performed by a single touch or a plurality of touch gestures on a 2D flat display.

Furthermore, the interactive gesture can also be performed in an augmented reality (AR) or virtual reality (VR) technology. An AR or VR image can be displayed through a flat display or a head-mounted display (HMD), and the user can perform a gesture over the image. An additional camera captures the gesture, and renders an interactive image by an image-processing process.

SUMMARY OF THE DISCLOSURE

The disclosure is related to an interactive method using a floating image display, a system thereof, and a floating image display. The floating image display is used to display a floating image. The system provides a user to experience manipulating a floating image with his/her gesture after being connected to a computer system.

The floating image display system essentially includes a floating image display and a driver operated in the computer system. The floating image display is equipped with a gesture sensor. The floating image display can be built in or externally connected to the computer system.

In one embodiment of the disclosure, the interactive method is operated in the floating image display that is connected to a computer system. The floating image display can be an individual device that is connected to the computer device via a specific connection. The floating image display can also be modularized to be disposed inside the computer system.

In the method, the floating image display receives an image data from the computer system. The display renders a floating image from the image data, and the floating image is displayed on a display panel. A user can then perform a gesture upon the floating image, and the gesture is sensed by a gesture sensor. The computer system then calculates variations of three-dimensional coordinates of the gesture so as to determine an interactive instruction.

Next, the interactive instruction is transmitted to the computer system. The computer system responds to the interactive instruction for obtaining a new image data according to the variations of the three-dimensional coordinates. The new image data is transmitted to the floating image display. After converting the new floating image data generated from the new image data, a new floating image is rendered and displayed on a display panel.

Further, the computer system operates a software procedure that is used to perform a corresponding procedure according to an interactive instruction. The computer system then generates a new image data according to the variations of the three-dimensional coordinates. The new image data renders a new floating image to be displayed on the floating image display. The new floating image is corresponding to a gesture operation performed by a user.

Preferably, the gesture operation reflects the variations of three-dimensional coordinates of fingers, palm positions and knuckles of a hand. The interactive instruction indicates one or any combination of movement, rotation and zooming that causes the software procedure to execute the corresponding procedure.

Further, the computer system operates a driver for initiating an interface for the computer system to communicate with the floating image display. The driver is used to interpret and translate the signals exchanged between the computer system and the floating image display. In the computer system, a driver responds to the interactive instruction and issues a request to an image server for downloading the image data or the new image data provided to the floating image display. In one aspect, the image data records color information and three-dimensional space information that is used to depict the floating image.

In one aspect of the floating image display of the disclosure, the circuits of the floating image display includes an image processor that is used to process the image data for rendering a floating image, and an input interface used for connecting to a gesture sensor for receiving signals generated by the gesture sensor sensing the gesture. The signals are provided for the image processor to calculate variations of the three-dimensional coordinates for generating an interactive instruction. The circuits include a display driving unit that obtains a floating image according to the floating image data, and the floating image is displayed by a display unit, and a computer connection unit that allows the floating image display to connect with a computer device.

When the floating image display receives the image data from the computer system, the floating image display obtains the floating image data from the image data. After the display driving unit converts the floating image data, a floating image is rendered and displayed by the display unit. The floating image is provided for the user to performing his/her gesture thereon directly. The gesture operation from the user's manipulation on the floating image generates signals for the computer system so as to control a software procedure to execute the corresponding procedure.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
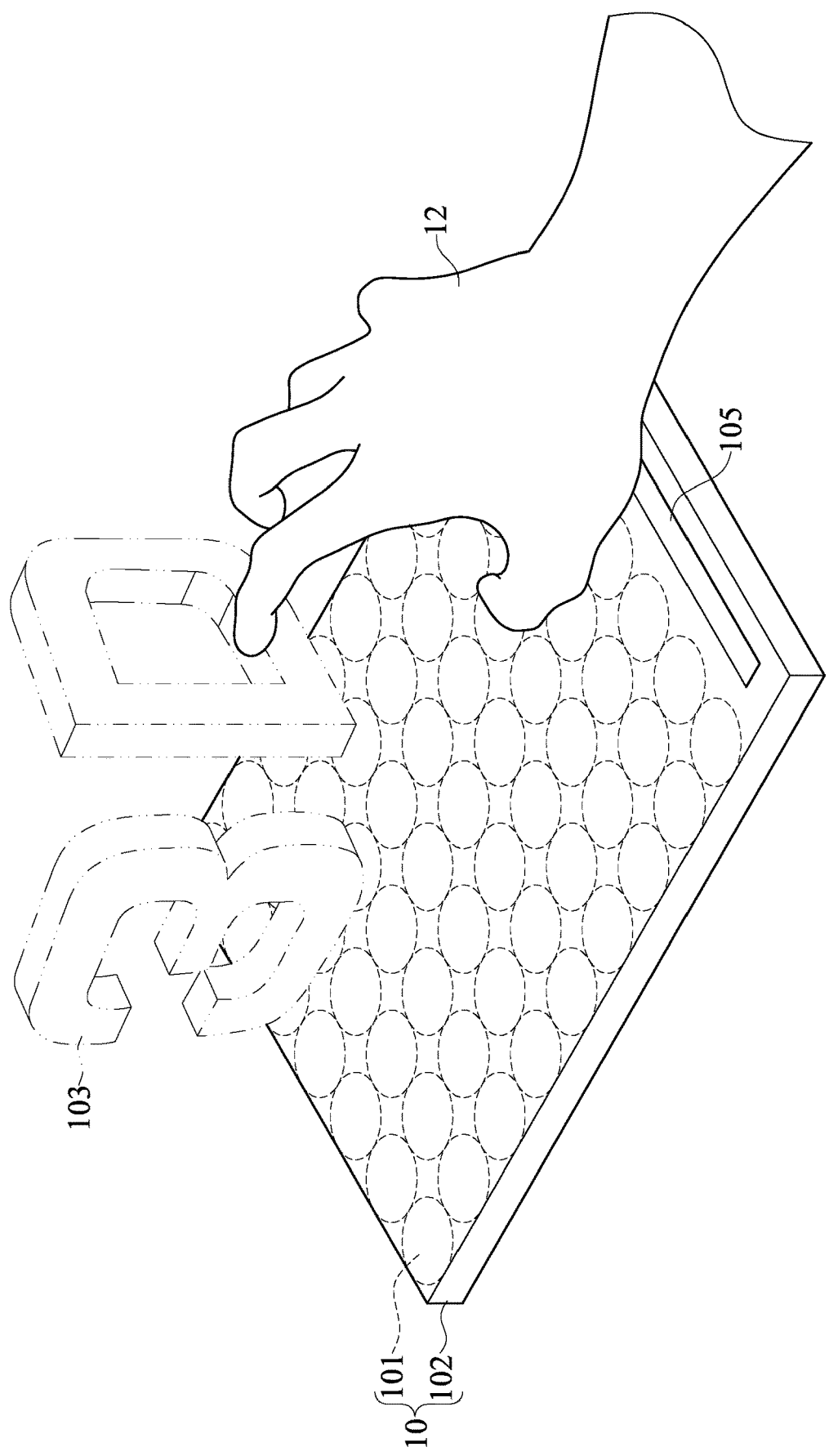
FIG. 1 is a schematic diagram depicting a floating image display in one embodiment of the disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

The disclosure is related to a floating image display and an interactive method using the floating image display, and a system for displaying a floating image. The floating image display allows a user to interact with the floating image by gesture when viewing the image. In an exemplary example, a gesture sensor is used to sense the gesture that is performed over the floating image. The gesture is such as a moving, rotating or zooming action performed by the user. Three-dimensional coordinate variations corresponding to the gesture can be obtained and are used to determine an interactive instruction. The floating image display can display the floating image in response to the gesture. Therefore, the user can interact with the floating image by gesture. It should be noted that the floating image can be a static three-dimensional object or a moving object that is formed by a series of floating images in motion.

In one of the embodiments of the display, the floating image display is able to display the floating image. The relevant technology utilizes a flat display panel to display multiple unit images simultaneously and the unit images render a full image, i.e. an integrated image. During the process of displaying the floating image, the integrated image displayed on the flat display panel can be projected to a space at a distance from the panel through an optical element, e.g. a lens array. Every unit image displayed on the flat display panel can be imaged through a corresponding lens. Further, multiple unit images can render the integrated image through multiple lenses. Thus, an effect of displaying a floating image can be achieved.

It should be noted that, rather than the display device used in the conventional augmented reality (AR) or virtual reality (VR) technology, the floating image display apparatus of the disclosure produces a unique stereoscopic display effect through a three-dimensional display technology. Further, the AR or VR display technology renders the stereoscopic display effect through the two eyes of a user when a three-dimensional image is displayed on a screen in front of the eyes of the user. It is submitted that the floating image display technology of the disclosure renders a real floating three-dimensional image that is displayed in front of the eyes of the user through optical elements. The real three-dimensional image rendered by the floating image display allows the user to perform a gesture on the floating image. A new floating image can be computed in response to the gesture that is processed by the image-processing process.

An interactive effect that creates a real experience of operation on the floating image can be provided to the user.

Reference is made to FIG. 1 that depicts a schematic diagram of the floating image display according to one embodiment of the disclosure.

A floating image display 10 in accordance with one of the embodiments of the disclosure is depicted. The floating image display 10 is essentially composed of an optical element 101 and a display panel 102. An image processor is included for processing the display content. The floating image display 10 communicates with an external image source in order to acquire a floating image data. The floating image data is processed for rendering the floating image 103.

Further, the floating image display 10 includes a gesture sensor 105 that is used to sense the gesture performed upon the floating image 103 by a hand 12 of the user. The gesture sensor 105 can be implemented by an image detection method, in which a camera is used to capture a series of images of one or more key portions of the hand 12. The key portions are such as a finger, a palm, and/or knuckles. Through an image processing method, changes of the images of the hand 12 within a period of time can be obtained. Each of the key portions of the hand 12 can be depicted by three-dimensional coordinates $X_{sensor}$, $Y_{sensor}$ and $Z_{sensor}$ in the Cartesian coordinate system or $\gamma$, $\theta$ and $\varphi$ in the spherical coordinate system with respect to the gesture sensor. After continuously acquiring the coordinates of gesture, a three-dimensional coordinate variation can be obtained. The coordinates of the coordinate system with respect to the gesture sensor can be transformed to a coordinate system with respect to the floating image display 10. Variations in three-dimensional coordinates ($X_{device}$, $Y_{device}$, $Z_{device}$) can be expressed by vectors (i.e. displacement and direction) and rates (i.e. distance and time). The variations are provided for the system to determine an interaction instruction including one or any combination of moving, rotating or zooming actions.

In one further embodiment, the gesture sensor 105 senses a gesture by the principle of light blocking. The gesture sensor 105 uses a light source to emit a sensing light, a photo sensor senses light spots on a hand 12 when the hand 12 blocks the light in a range of the sensing light. Therefore, an amount of light spots reflected by each of the key portions and time differences occurred among the light spots can be obtained. It should be noted that the light spots reflected by the key portions reflect changes of the key portions, and the time differences indicate the information relating to depths of the key portions. Similarly, the light information being obtained continuously can be used to obtain three-dimensional coordinate variations formed by the gesture. The stereoscopic coordinate variations allow the system to identify an interactive instruction indicative of one or any combination of the actions such as moving, rotating and zooming.

In one further embodiment, the gesture sensor 105 can be implemented by a sound generator and a sound receiver that uses acoustic waves reflected by the hand 12 to determine the gesture. When the hand 12 is within a sensing range of the acoustic waves of the gesture sensor 105, the hand 12 blocks the acoustic waves, and reflected waves are formed. When the sound receiver receives the reflected waves, the changes of the reflected waves allow the sound receiver to detect variations of the key portions of the hand 12 in a space. The variations of the key portions can be interpreted as the three-dimensional coordinate variations that can be used to determine the interactive instruction indicative of one or any combination of the actions such as moving, rotating and zooming.

The gesture sensor 105 can be implemented by a variety of technologies in the interactive method for sensing the gesture performed by the user. The gesture indicates the positions of the fingers, the palm and/or the knuckles of the hand 12, and especially the variations of three-dimensional coordinates of the knuckles so as to determine the interactive instruction indicative of one or any combination of actions such as moving, rotation and zooming. After that, by querying the floating image data in an image database, a new corresponding floating image data can be used to display a next floating image data. The floating image data may include a static floating image or a video formed by a series of floating images. It should be noted that an interactive effect that instantly reacts to the user's gesture can be achieved by using processes including sensing the variations, transforming the coordinates, and calculating the floating image when performed with high-speed computation.

Figure 2:
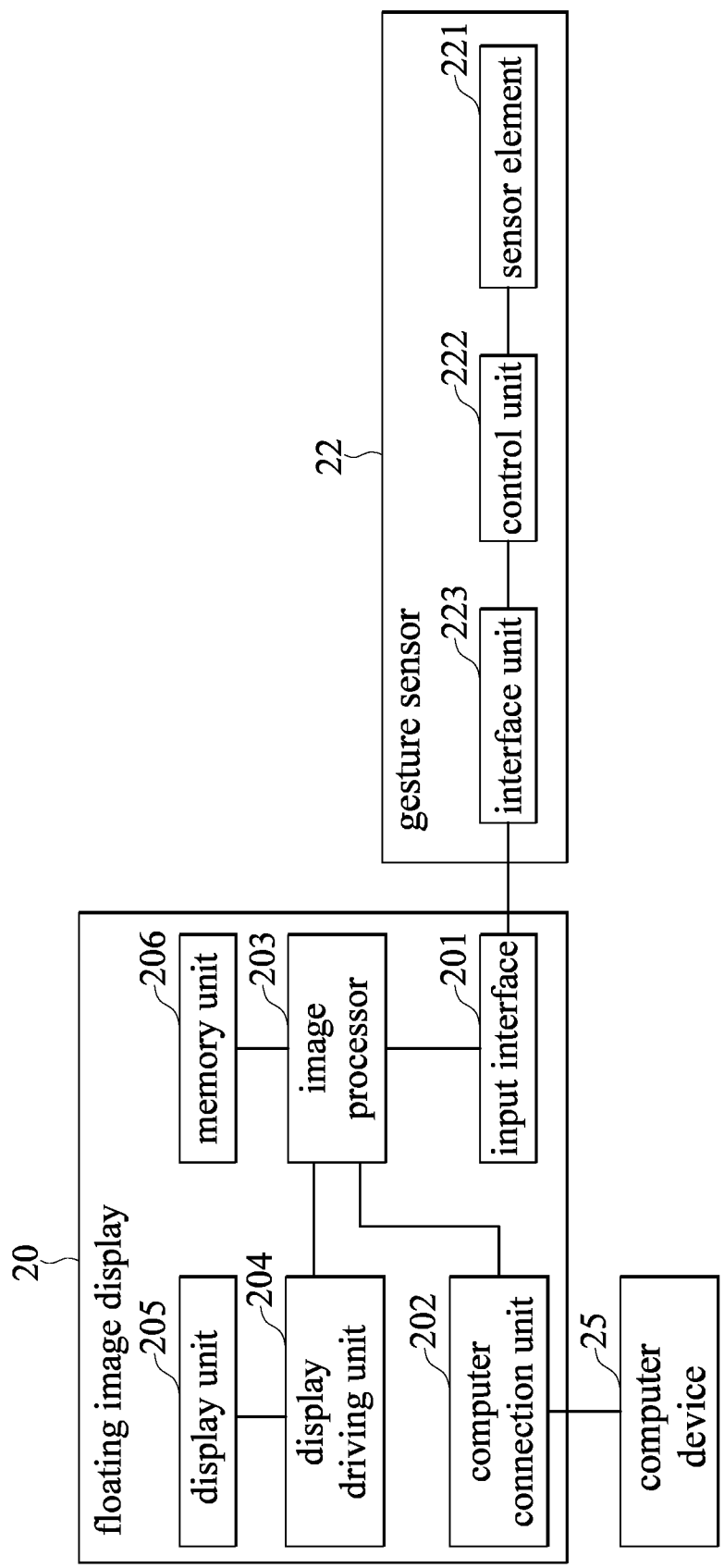
FIG. 2 is a block diagram depicting a circuitry of the floating image display according to one embodiment of the disclosure.

Reference is made to FIG. 2, showing a circuit diagram of a floating image display according to one embodiment of the disclosure.

A floating image display 20 is provided in the diagram. The floating image display 20 connects with a gesture sensor 22. In one embodiment of the disclosure, both the gesture sensor 22 and the floating image display 20 can be two modules that are integrated into one device, or alternatively the floating image display 20 and the gesture sensor 22 are two independent devices that are interconnected via a line for communicating with each other.

In the floating image display 20, an image processor 203 that performs image processing in the interactive method is provided. The image processor 203 is electrically connected with other electronic components such as an input interface 201. The floating image display 20 receives the data from sensing the gesture from the gesture sensor 22 via the input interface 201. The input interface 201 is a communication interface. According to one embodiment, the data received via the input interface 201 is the three-dimensional coordinate variations obtained by the gesture sensor 22. The image processor 203 determines the interactive instruction according to the three-dimensional coordinate variations. The interactive instruction allows the image processor 203 to calculate image coordinate data with respect to a new floating image.

In the image processor 203, when receiving the three-dimensional coordinate variations corresponding to the gesture sensed by the gesture sensor 22, the interactive instruction indicative of the moving, rotating and/or zooming actions can be calculated. The interactive instruction is provided for querying the image database in a memory unit 206 so as to obtain the floating image data corresponding to the variations, or alternatively the floating image data can be calculated by the image processor 203 instantly according to the interactive instruction. The floating image can be a static floating image or a video formed by a series of floating images. The floating image data records color information and three-dimensional space information for the floating image display 20 to display the floating image. The image processor 203 is electrically connected with a display driving unit 204 that is used to process the floating image data for generating the floating image to be displayed by a display unit 205.

The floating image display 20 connects to an interface unit 223 of the gesture sensor 22 via a wired or wireless connection. The interface unit 223 is a communication interface used to transmit signals. The gesture sensor 22 includes a sensor element 221 that is used to sense the gesture by lights, sounds, or images. The gesture indicates changes of some key portions of a hand, including the changes of the positions of fingers, palm and/or knuckles.

A control unit 222 acts as a control circuit of the gesture sensor 22. The control unit 222 connects with the floating image display 20 via the interface unit 223. The control unit 222 produces the three-dimensional coordinate variations with respect to the gesture sensed by the sensor element 221.

Further, the three-dimensional coordinate variations corresponding to the gesture sensed by the gesture sensor 22 are based on the coordinates in the coordinate system with respect to the gesture sensor 22. A coordinate transformation may be required if the three-dimensional coordinate variations are transferred to the floating image display 20. The coordinate transformation is performed to transform coordinate data in a coordinate system with respect to the gesture sensor 22 according to the interactive instruction into a coordinate system with respect to the floating image display 20 for displaying the floating image through image coordinate data.

The floating image display 20 displays the floating image according to the well-defined positions of the whole image. A correlation of the gesture between its original coordinate system and the coordinate system in the floating image display 20 can be determined after coordinate transformation. The correlation indicates a relationship between the three-dimensional coordinates with respect to the gesture and the floating image to be displayed. In an exemplary example, a moving gesture causes the floating image to move toward a specific direction, and a variation along this direction should be added to the three-dimensional coordinates of the floating image. Therefore, the floating image should be updated to a new position so as to generate a new floating image. In the image processor 203, a new floating image data can be obtained by querying the image database or by real-time calculation. The floating image data is provided to the display driving unit 204 for displaying the floating image. Further, a rotating gesture causes the floating image to rotate at an angle, so that this variation should be added to the three-dimensional coordinates of the floating image so as to form another new floating image data. Still further, a zooming gesture will change a size of the floating image at a same reference position. The three-dimensional coordinates relating to the floating image change with the zooming gesture. After the image processor 203 queries the image database or performs a real-time calculation, a new floating image data is generated for the display driving unit 204 to display.

The moving, rotating and zooming actions made by the gesture may be combined at will for forming an interactive instruction. The interactive instruction is provided for the image processor 203 to calculate a new floating image data. The floating image data is provided for the floating image display 20 to display a floating image.

According to one further embodiment of the interactive method performed by the floating image display of the disclosure, the floating image display 20 includes a computer connection unit 202 that is electrically connected with the image processor 203. The computer connection unit 202 allows the floating image display 20 to connect to a computer device 25 via a specific interface that is implemented by wireless means (e.g., Wi-Fi®, Bluetooth®) or wired means (e.g., universal serial bus, RS232 or the like). The computer device 25 operates a computer system that executes a driver which is used to communicate with the floating image display 20. The driver in the floating image display 20 allows the interactive instruction responsive to the gesture to be transmitted to the computer system. The computer system then responds to this interactive instruction and renders a new floating image data. The new floating image data is transmitted back to the floating image display 20 for displaying the new floating image.

According to one of the embodiments, the driver operated in the computer system can be used to initiate an interface for the computer system to communicate with the floating image display 20. The driver is used to interpret and translate the signals exchanged between the computer system and the floating image display 20. Further, the driver can issue a request to an external system, e.g., an image server, for downloading the image data or the new image data provided to the floating image display 20 according to the signals generated by the computer system as responding to an interactive instruction. The image data is such as a floating image resource file that records color information and three-dimensional space information and allows the image processor 203 of the display 20 to render a floating image with a height from the display panel.

Figure 3:
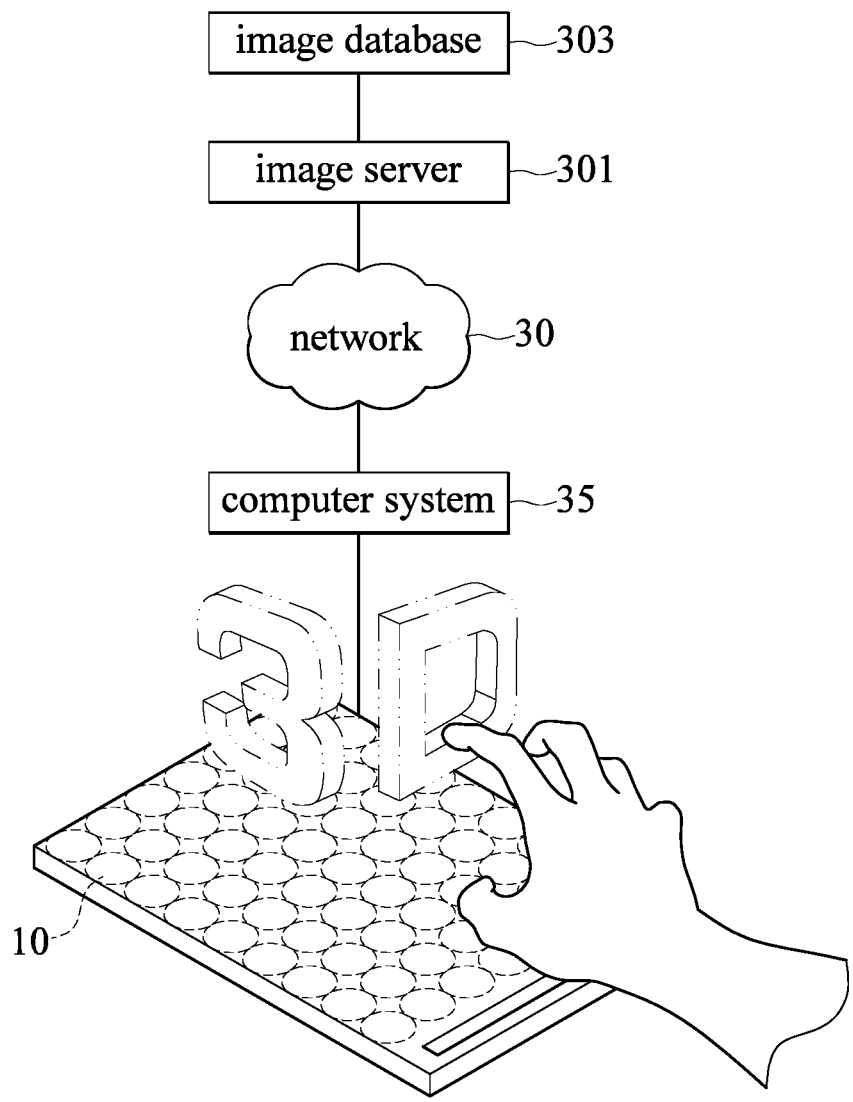
FIG. 3 is a schematic diagram depicting the floating image display connected to an external system via a computer system according to one embodiment of the disclosure.

Reference is made to FIG. 3, showing the floating image display that is connected with an external system via a computer system 35 according to one further embodiment of the disclosure. The floating image display 10 connects with an image server 301 via a network 30. The above-mentioned floating image data can be provided by the image server 301. The image server 301 provides an image database 303 for querying the floating image data according to an interactive instruction.

In an exemplary example, the data stored in a memory of the floating image display 10 can be queried if it includes the floating image data corresponding to a next action of a gesture due to the interactive instruction when a user performs an interaction on the floating image. If the data stored in the floating image display 10 already includes the image data relating to the next action, the floating image display 10 can itself produce the floating image data and display the floating image. Otherwise, if the floating image display 10 does not include the image data relating to the next action, the interactive instruction is transmitted to the computer system 35 and a request for acquiring new floating image data/file is generated and transmitted to the image server 301 via the network 30. The new floating image data is loaded to the floating image display 10 through the computer system 35. A new floating image in response to the interaction is displayed.

Referring to FIG. 1, when an interaction is performed upon the floating image displayed on the floating image display 10 by the hand 12 of the user, the gesture of the interaction forms three-dimensional coordinate variations that are used to obtain the interactive instruction. At this time, the interactive instruction is transmitted to the computer system 35 via a specific communication interface. A software procedure operating in the computer system 35 performs a specific procedure in response to the interactive instruction. The interactive instruction can also be transmitted to the image server 301 via the network 30, and the image server 301 provides new floating image data according to the interactive instruction.

Figure 4:
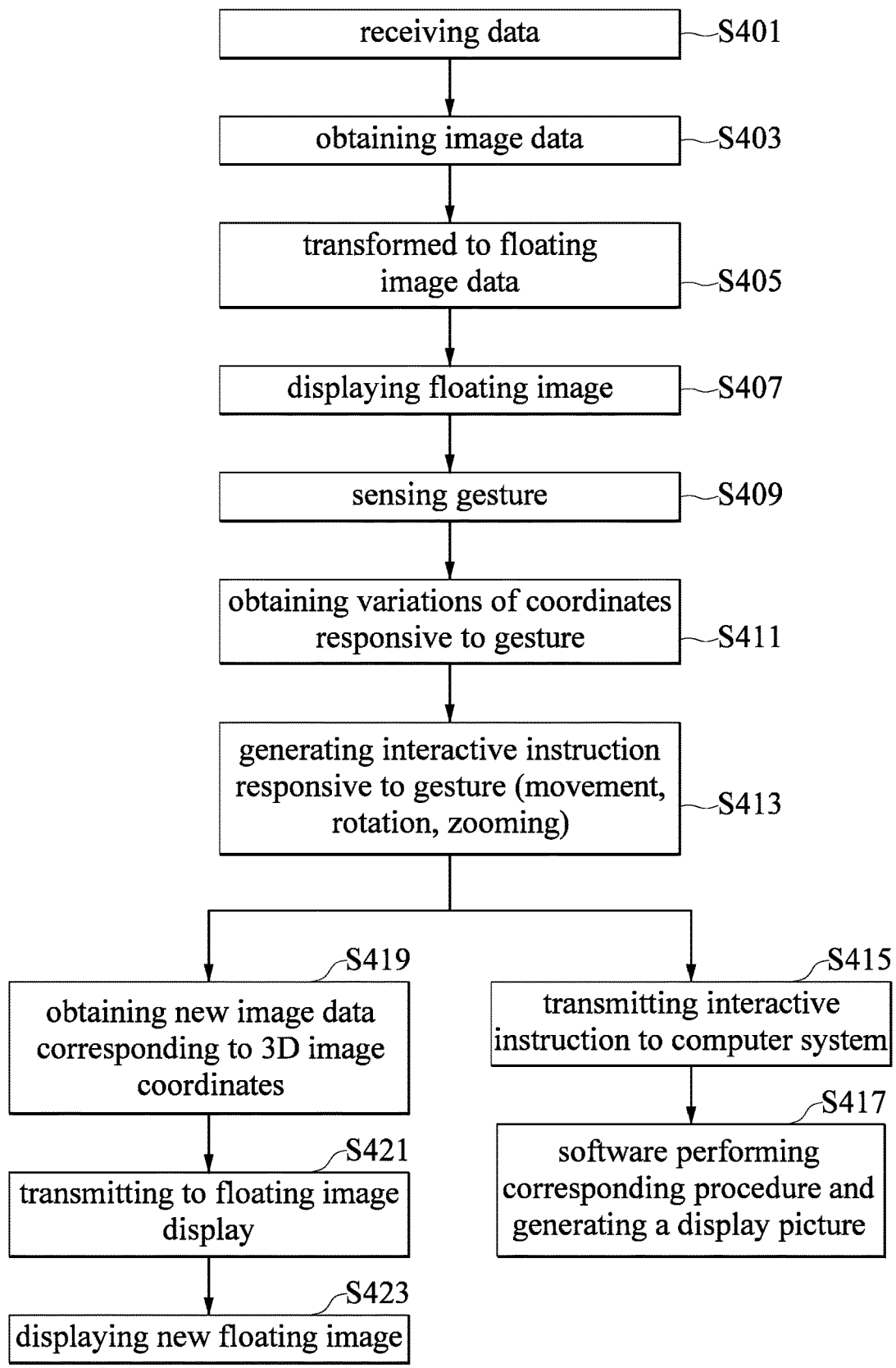
FIG. 4 shows a flow chart describing an interactive process performed with a floating image display according to one embodiment of the disclosure.

Next, reference is made to FIG. 4 that shows a flow chart for describing the interactive method performed by the floating image display that is cooperated with a computer system according to one embodiment of the disclosure.

In one aspect of the disclosure, the floating image display can be modularized and be built-in in the computer device. In another aspect, the floating image display is an individual device that is connected to the computer device via a specific communication method. In the present process, the floating image displayed on the floating image display is generally rendered by a specific software procedure operated in the computer system.

In the beginning of the process, the computer system receives the image data after establishing a connection between the computer system and floating image display (step S401). The image data records color information and three-dimensional space information used for rendering the floating image. The image processor of the floating image display can therefore obtain the image data (step S403), and converts the image data to a floating image data (step S405).

Next, in step S407, a floating image display displays a floating image. A user may perform a gesture upon the floating image display. In step S409, the gesture sensor of the floating image display senses a gesture. In step S411, the process running in the floating image display obtains the variations of coordinates with respect to the gesture. In step S413, an image processor of the floating image display determines an interactive instruction according to three-dimensional coordinate variations formed by the gesture from a specific portion with moving, rotating and/or zooming actions.

Further, in step S415, the interactive instruction is transmitted to the computer system via a communication interface connecting with the computer system. In step S417, a software procedure operated in the computer system performs a corresponding procedure according to the interactive instruction. The procedure drives the computer system to display a new image such the image of a next step of the software procedure. At this time, in step S419, the computer system performs an action with respect to the interactive instruction of the software procedure, and the action is in response to the variations of the three-dimensional coordinates. The variations can be used to render the image data or the new image data being provided to the floating image display. Alternatively, the software procedure receives the interactive instruction formed by the gesture received by the floating image display, and performs the corresponding procedure according to the interactive instruction. The interactive instruction is generated based on the user's gesture operation of the software procedure. An operating program of the computer system can form the new image data provided to the floating image display according to the new interactive instruction generated by the software procedure.

In step S421, the computer system transmits the new image data corresponding to the present interactive instruction to floating image display. The new image data includes the information of colors and three-dimensional coordinates. In step S423, the floating image display renders a new floating image data and displays a new floating image.

Figure 5:
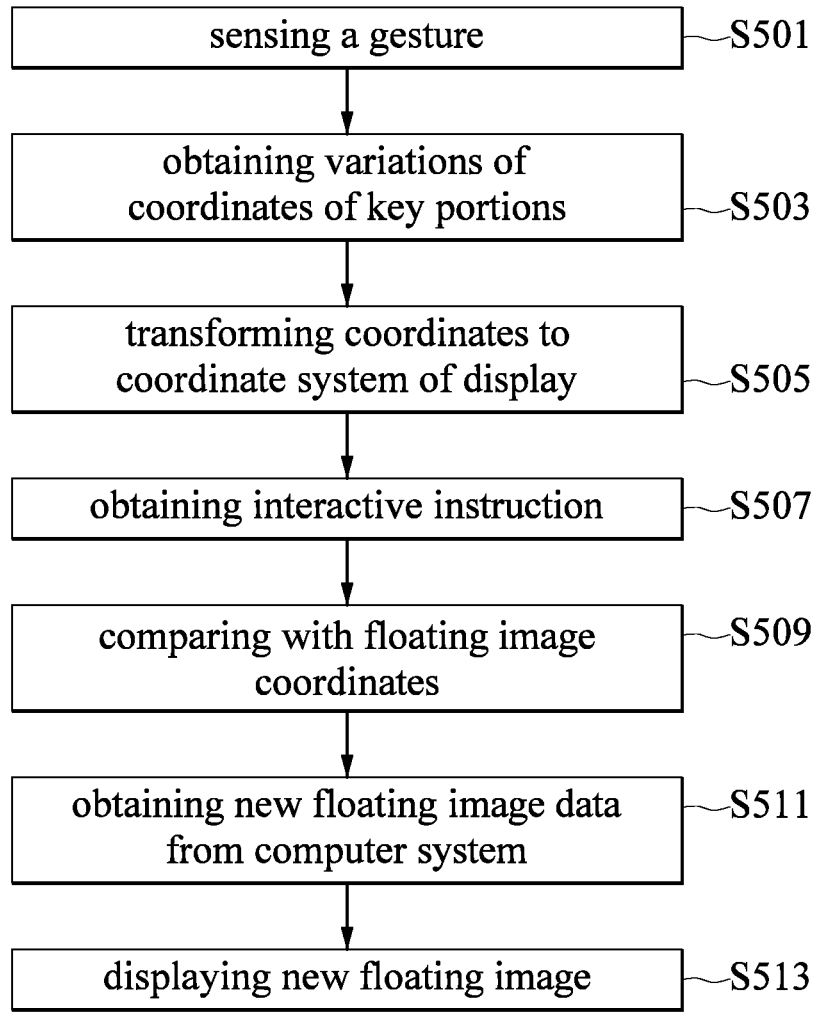
FIG. 5 shows another flow chart describing the interactive method in another embodiment of the disclosure.

Reference is made to FIG. 5, which shows another flow chart that describes that a gesture sensor is used to generate an interactive instruction according to a gesture for performing the interactive method in one embodiment of the disclosure.

Initially, such as in step S501, a user can view a floating image through a floating image display and perform a gesture on the floating image. A gesture sensor is used to sense the gesture performed upon a floating image displayed on the floating image display. In step S503, variations of three-dimensional coordinates with respect to one or any combination of key portions such as fingers, palm and/or knuckles can be obtained. In step S505, the variations of three-dimensional coordinates are formed by the gesture sensed by the gesture sensor within a period of time. If necessary, the coordinate data in a coordinate system with respect to the gesture sensor may be transformed to a coordinate system with respect to the floating image display. Therefore, the gesture can be recognized by the image processor when the coordinate data of the gesture is of the coordinate system that is the same with the coordinate system of the image processor. The image processor generates an interactive instruction formed by the gesture and recognizes a correlation between the interactive instruction and the floating image to be displayed.

In step S507, three-dimensional coordinate variations with respect to one or more key portions can be determined from the gesture. The interactive instruction can accordingly be determined. In one embodiment, the interactive instruction is transmitted to the computer system. The interactive instruction is then compared to the image coordinate data of the original floating image, and a new image coordinate data of a new floating image is obtained (step S509). According to one of the embodiments of the disclosure, in the floating image display, the interactive instruction can be determined by the gesture operation. An image processor of the display queries the image data in the memory unit according to the interactive instruction. The image data responsive to the gesture operation can be used to render the floating image data in response to the variations of the three-dimensional coordinates. Alternatively, the image processor of the display calculates the floating image data corresponding to the variations of three-dimensional coordinates according to the interactive instruction in real-time.

Further, a driver operated in the computer system issues a request for querying the image database to the image server according to the signals responsive to the interactive instruction. The computer system can therefore download a corresponding image data. The floating image display can then obtain a next floating image data belonging to a gesture operation performed on a floating image from the computer system (step S511). The next floating image data allows the display to display a new floating image (step S513).

Figure 6:
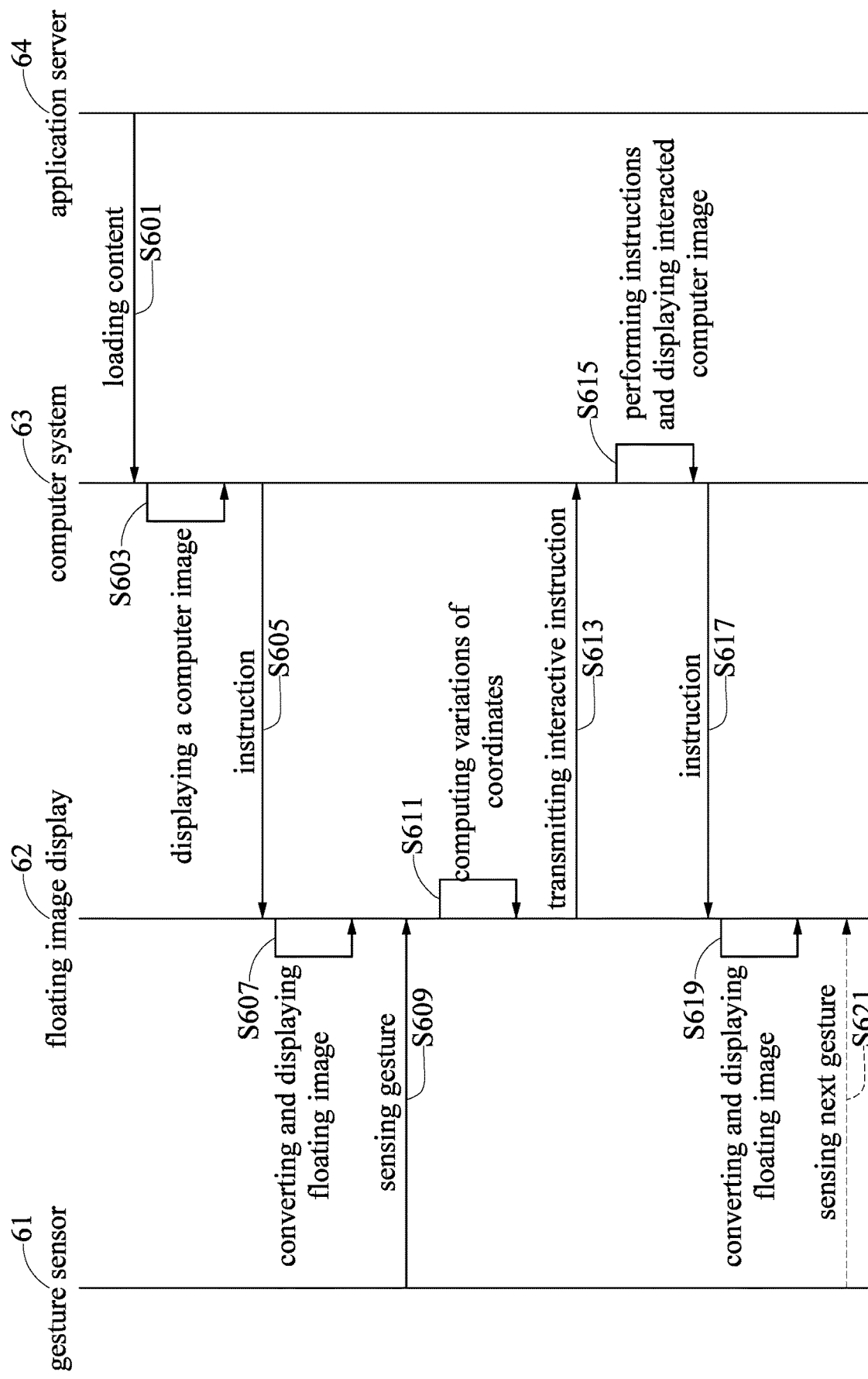
FIG. 6 shows one further flow chart describing the interactive method in one further embodiment of the disclosure.

Reference is made to FIG. 6, which shows a flow chart describing an interactive method with a floating image display according to one embodiment of the disclosure. The flow chart generally relates to an interactive process among a gesture sensor 61, a floating image display 62, a computer system 63 and an application server 64.

In the present flow chart, a computer device is connected with the floating image display 62 and is provided for performing the interactive method. When a software program operated in the computer system 63 is executed to initiate a software procedure, the software procedure loads a requested content such as a web page from the application server 64 (step S601). At this time, the computer system 63 displays an image (step S603). When a user manipulates the software procedure, some instructive data including the data of floating image is generated. The data is then transmitted to the floating image display 62 via a specific communication interface (step S605). The image processor of the floating image display 62 then relies on color information and three-dimensional space information in the data to calculate a floating image data (step S607). The floating image is displayed via a display panel of the floating image display.

The user can view a floating image rendered by the floating image display 62. The user can also perform gesture operation over the floating image. The gesture sensor 61 associated to the floating image display 62 is used to sense the gesture (step S609). The variations of the three-dimensional coordinates with respect to the movements, rotations and zooming of the floating image can be calculated. An interactive instruction is correspondingly generated (step S611).

After that, the floating image display 62 transmits the interactive instruction to the computer system 63 (step S613). The software procedure operated in the computer system 63 relies on the interactive instruction to generate a corresponding procedure. The procedure at least includes displaying an interacted image (step S615). Further content can be retrieved from the application server 64 when the computer system 63 responds to the interactive instruction. A new image data corresponding to the variations of the three-dimensional coordinates is obtained. The new image data is then transmitted to the floating image display 62 in a form of instruction packets (step S617).

In the floating image display 62, the image data can be retrieved from the received instruction packets. A floating image data can be calculated. The display panel is used to display the floating image that is formed based on the interaction (step S619). The floating image display 62 continuously waits for sensing a next gesture (step S621).

In the embodiments of the disclosure, the floating image display can use a plurality of ways to co-operate with the computer device. For example, the floating image display can be modularized to be disposed in the computer system and the gesture sensor is disposed at a position where it is able to sense the gesture.

Figure 7:
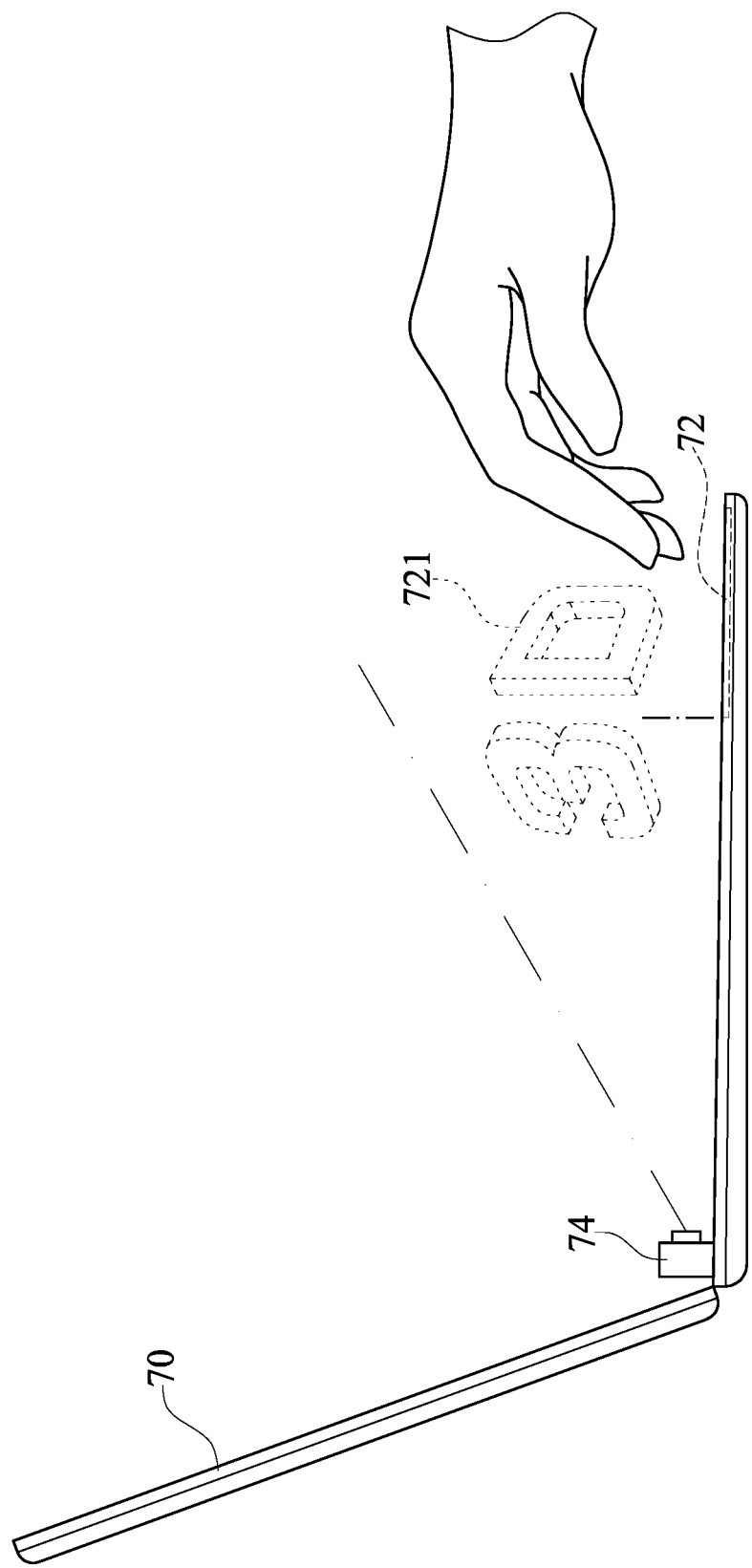
FIG. 7 is a schematic diagram depicting a computer device that includes a floating image display according to one embodiment of the disclosure.

FIG. 7 is a schematic diagram depicting a floating image display disposed inside a computer device according to one embodiment of the disclosure.

A computer device 70 such as a laptop computer is shown in the diagram. A modularized floating image display is installed as a part of a keyboard structure of the computer device 70. The floating image display is such as a floating image display module 72 built in the computer device 70. The structure and the circuits of the system can be exemplarily shown as in FIG. 1 and FIG. 2.

The circuits of the floating image display module 72 render a floating image 721 by converting the image data provided by the computer system. A gesture sensor 74 is disposed at a specific position of the computer device 70. The gesture sensor 74 and the floating image display module 72 are electrically interconnected. The gesture performed by the user can be determined by an image detection technology, a light-blocking detection technology, or an acoustic-wave detection technology. The gesture operation reflects the variations of three-dimensional coordinates of fingers, palm positions, knuckles of a hand, an object or a part of the body that is used to interact with the floating image. More specifically, the technology of the gesture sensor 74 embodies a three-dimensional touch technology. The gesture sensor 74 can implement a spatial sensor. The spatial sensor can be an optical sensor such as a 2D camera, a depth camera or an optical grating sensor. The spatial sensor can also be a hovering touch sensor that can be implemented by radar or an ultrasonic detector. The gesture sensor 74 can continuously track movements of the hand of the user, an object or any part of the body. The circuits of the floating image display module 72 can also perform a tracking algorithm, knuckles movement analysis, and coordinate transformation. The gesture sensor 74 generates an interactive instruction by determining actions of movement, rotation and zooming with respect to the specific part of the body compared to the floating image according to a lookup table. The lookup table generally records the relationship between the predetermined gestures and interactive instructions.

Figure 8:
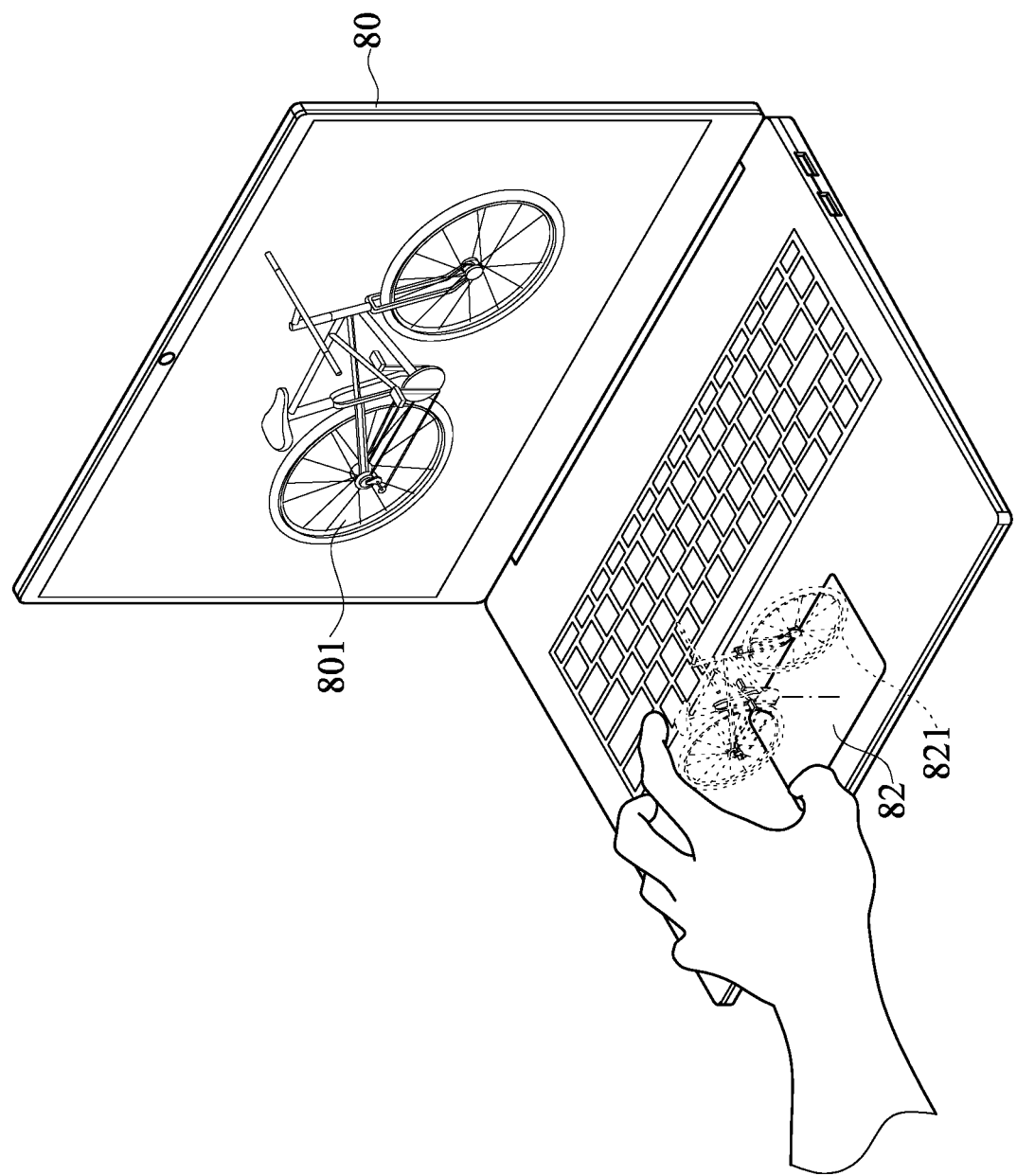
FIG. 8 is a schematic diagram depicting a computer device with a built-in floating image display module according to one embodiment of the disclosure.

FIG. 8 is a schematic diagram depicting a floating image display module 82 built in a computer device 80 in one embodiment of the disclosure. The floating image display is modularized to be installed inside the structure of the computer device 80. A floating image 821 is displayed by the floating image display module 82 at a specific position of the computer device 80. The corresponding software procedure operated in the computer device 80 drives the display to display a corresponding image 801.

Figure 9:
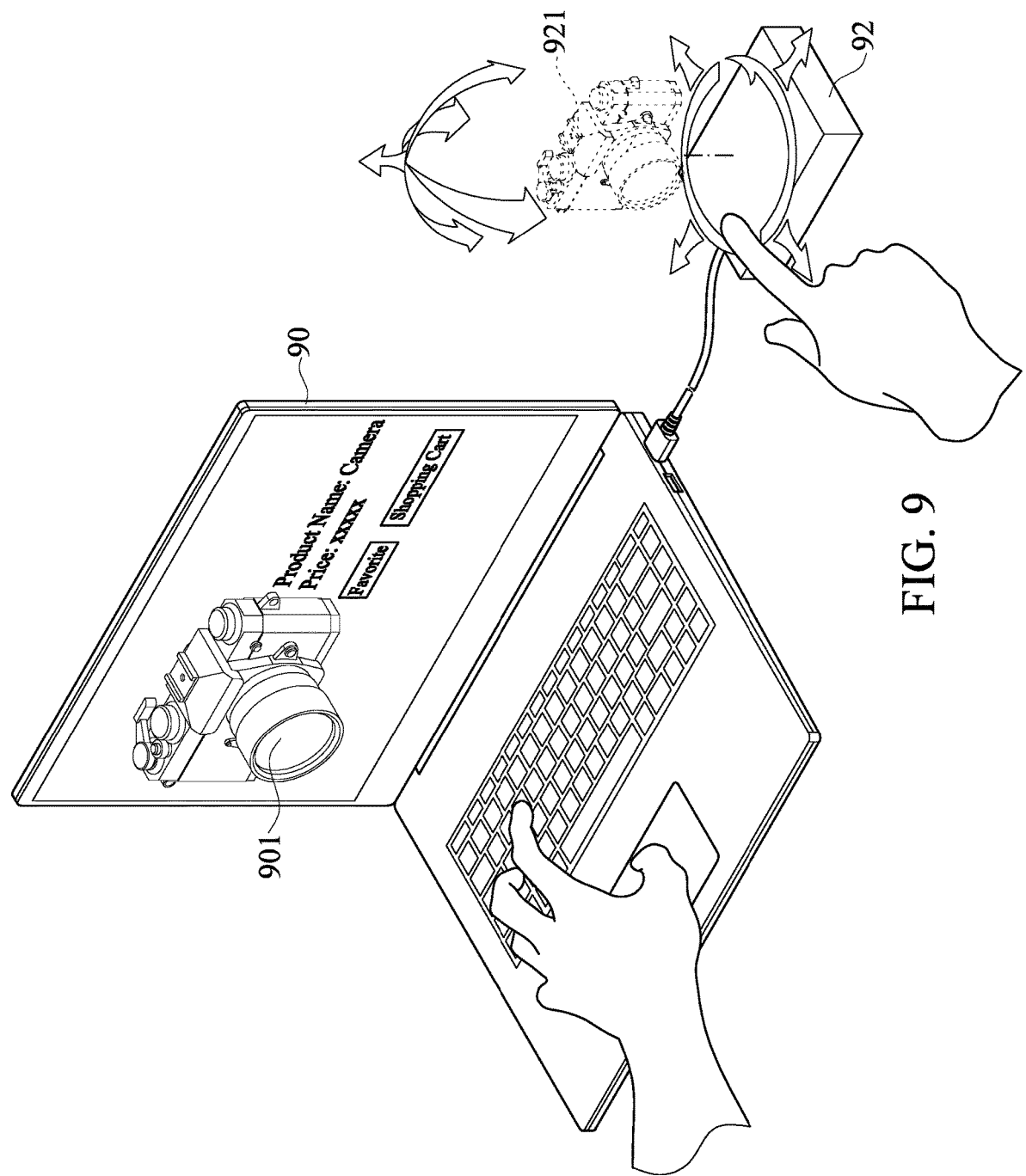
FIG. 9 is a schematic diagram depicting a circumstance that a computer device is connected with a floating image display according to one embodiment of the disclosure.

FIG. 9 shows another example of the present disclosure that retrieves content from an external application server by a computer device 90. The application server can be an e-commerce platform. The computer device 90 displays a product image 901 and annotations including a title of the product and a price of the product. The user can also perform other actions such as selecting the products as his/her favorites or putting the products into a shopping cart. At this time, a floating image display 92 external to the computer device 90 can synchronously display a product floating image 921.

In addition to viewing the product floating image 921 via the floating image display 92, the user can also browse a three-dimensional view of the product through gesture operation. The gesture operation can be referred to as the arrows around the three-dimensional product floating image 921 exemplarily shown in the diagram. The arrows indicate that the user can manipulate a floating image to be rotated in various spatial directions such as left-to-right horizontal rotation, up-to-down vertical rotation, or other directions of rotation. The floating image responsive to the gesture can be rendered according to the aforementioned embodiments of the disclosure. In one aspect of the disclosure, the floating image display 92 can contain a complete image data of the product. In another aspect of the disclosure, the image data can be obtained from the computer device 90 or an external image server based on the gesture operation of the user.

In an exemplary example, the floating image display 92 can display one or more products of interest to the user, and the user can select the products through one or a combination of gestures. The product image can be moved in various directions by the gesture operation. The user can freely rotate the product to view the product from various angles by frontward-backward movement, left-right horizontal movement, or up-down vertical movement. Further, the user can view more details of the product by zooming in the product image, or view more products by zooming out the product image. Still further, the user can view a previous or a next product by the gesture operation. After that, the user can select one of the products and proceed to checkout.

Figure 10:
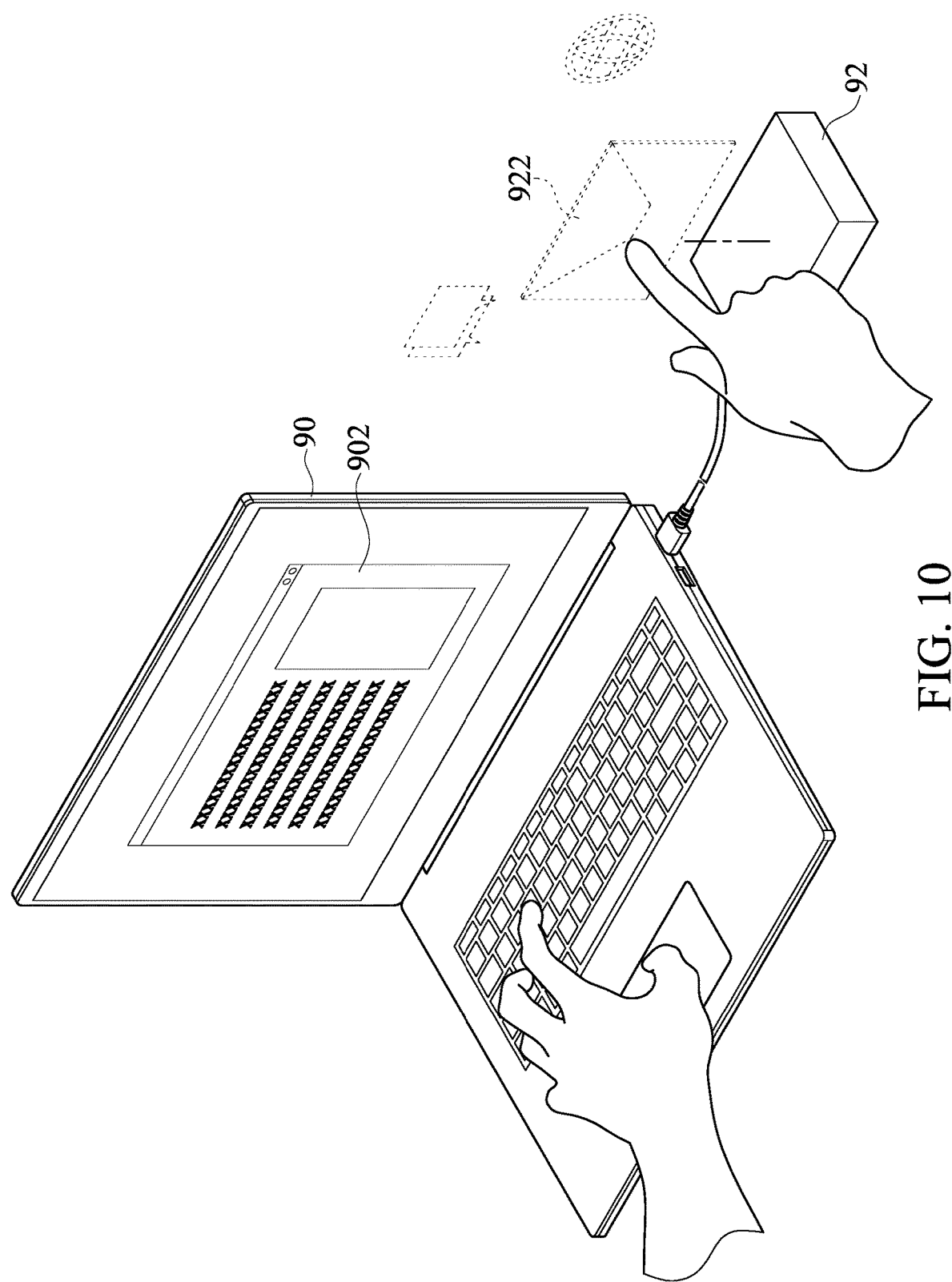
FIG. 10 is another schematic diagram depicting another circumstance that a computer device is connected with a floating image display according to one embodiment of the disclosure.

FIG. 10 shows one further schematic diagram depicting a computer system operated in the computer device 90 which performs one or more applications in one embodiment of the disclosure. A screen shows an application image 902. The external floating image display 92 can show a floating image 922 corresponding to one or more application programs synchronously. For example, a menu with multiple icons of applications is shown as the floating image 922 that allows the user to select one of the application programs to be executed or viewed by the user's gesture operation. An interactive instruction is therefore generated and transmitted to the computer system for displaying the corresponding application image 902.

In an exemplary example, the user can view multiple icons of applications on the floating image display 92 and also manipulate the floating image 922. The floating image display 92 can show one or more floating icons. The floating image can be zoomed in or out through one or a combination of gestures of the user.

Figure 11:
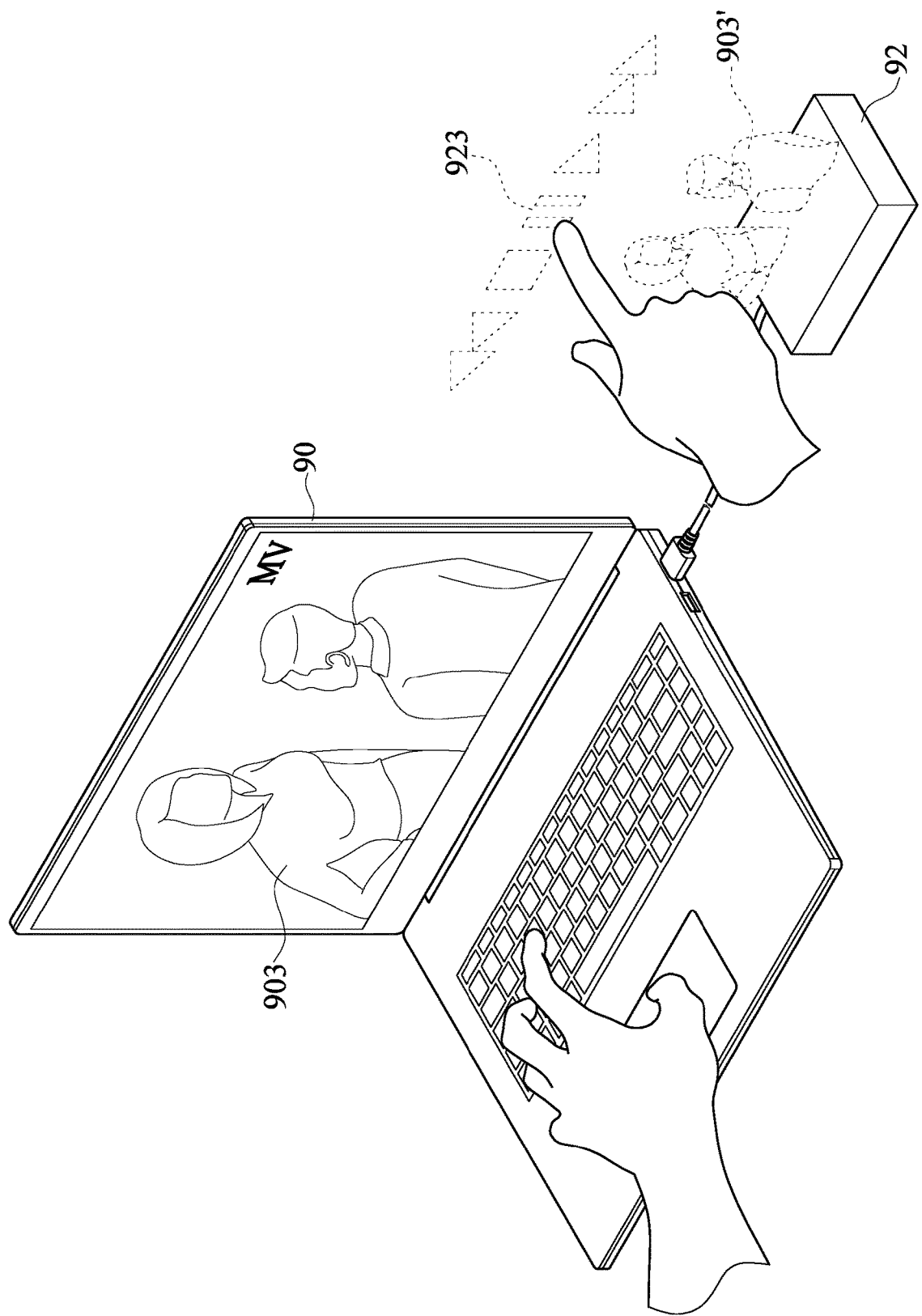
FIG. 11 is yet another schematic diagram depicting yet another circumstance that a computer device is connected with a floating image display according to one embodiment of the disclosure.

FIG. 11 shows a schematic diagram depicting a video player executed in the computer device 90 in one embodiment of the disclosure. A video player image 903 is displayed on the computer device 90. The floating image display 92 is an external device that shows a floating image such as a music playback tool floating image 923 provided for the user to perform a gesture operation thereon. Several functional icons indicative of pausing, stopping, playing, fast-forward and fast-backward functions are shown as the music playback tool floating image 923. The music playback tool floating image 923 displayed by the floating image display 92 allows the user to manipulate playing, pausing, stopping or fast forwarding/backwarding the music.

For example, the user performs a gesture operation to select a music video such as a video 903'. After that, the user performs a gesture operation over the corresponding music playback tool floating image 923 that is displayed by the floating image display 92. The user can therefore view the video from different angles of view. The user can zoom in or zoom out the floating image. The user can also play, pause, and select the previous or next video to be played by his/her gesture.

Figure 12:
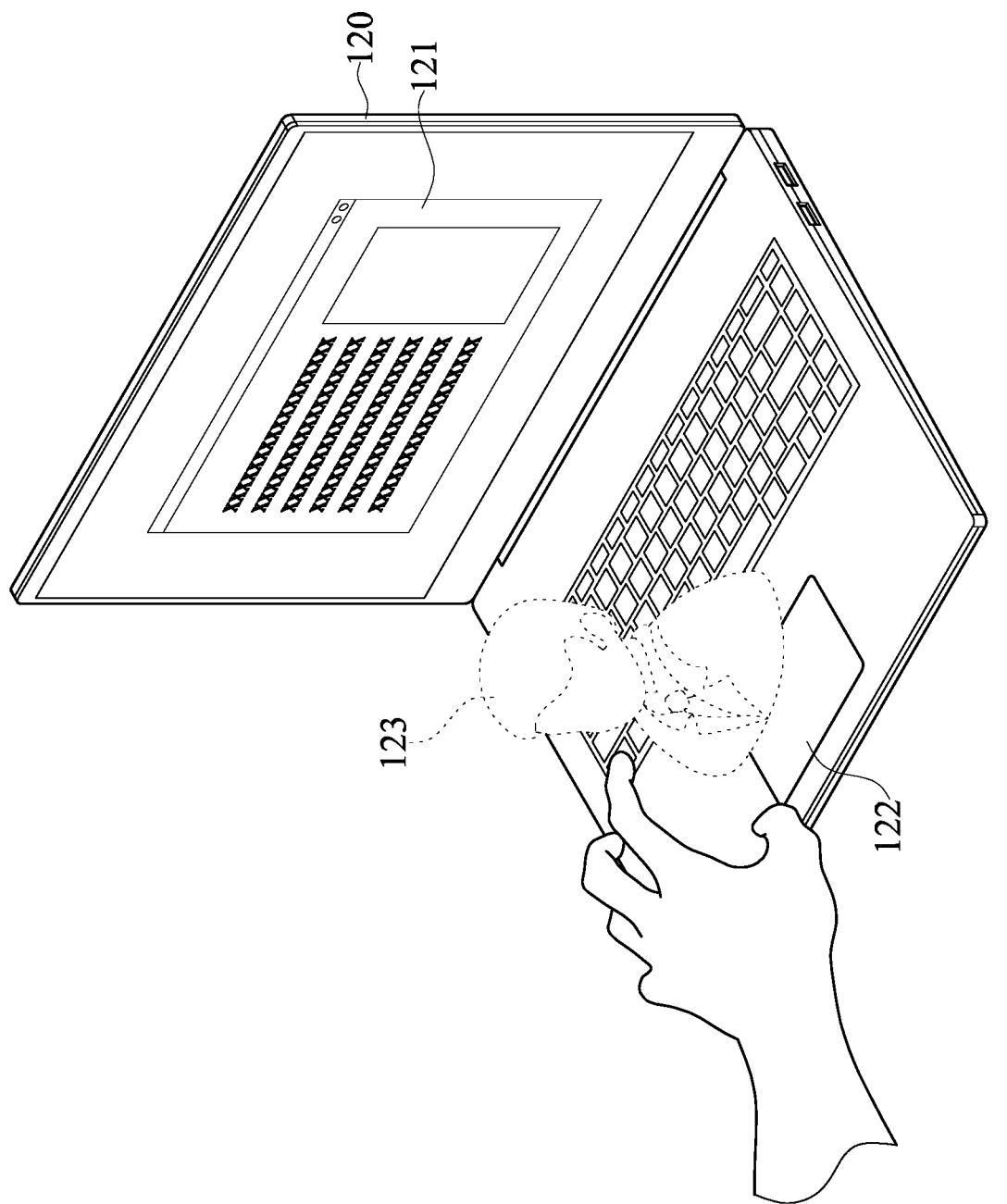
FIG. 12 shows a schematic diagram depicting a virtual assistant displayed by a floating image display in one embodiment of the disclosure.

FIG. 12 schematically shows a computer device 120. A floating image display module 122 is installed inside the computer device 120. The floating image display module 122 displays a virtual assistant floating image 123 in response to an operation of a computer system. A computer image 121 is displayed on the computer device 120 synchronously. The computer image 121 denotes a result after manipulating the virtual assistant floating image 123.

The computer system embodies the virtual assistant via the floating image display module 122. The user can interact with the virtual assistant floating image 123 by touching the virtual assistant floating image 123. The different parts of the virtual assistant floating image 123 may produce different reactions with subsequent images. For example, the virtual assistant greets the user if the user touches the head of the virtual assistant; the virtual assistant falls when the user touches the foot of the virtual assistant.

In conclusion, a floating image display is provided in the disclosure for displaying a floating image, and an interactive method is performed when the floating image display is linked with a computer system. Rather than the conventional stereoscopic effect caused by binocular parallax, the floating image is particularly a real image that is formed by projecting multiple beams of light. Therefore, the floating image display provides a solution that allows the user to interact with the floating image, and the computer system can perform a corresponding software procedure in response to the interaction.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An interactive method performed in a floating image display which is connected with a computer system, comprising:

receiving image data from the computer system and converting the image data to a floating image data;

converting the floating image data so as to display a floating image via a flat display panel of the floating image display that is modularized to be installed in a computer device that operates the computer system, and the modularized floating image display renders the floating image; wherein the flat display panel is used to display an integrated image that is composed by multiple unit images, and the integrated image displayed on the flat display panel is projected to a space at a distance from the flat display panel through a lens array, in which each of the multiple unit images is displayed on the flat display panel through a corresponding lens so as to project the multiple unit images to the space through the lens array for constructing the floating image;

sensing a gesture by a gesture sensor that is disposed on the computer device and electrically connected with the modularized floating image display, wherein the gesture sensor continuously tracks a series of actions according to the gesture so as to obtain variations of three-dimensional coordinates responsive to the gesture;

determining an interactive instruction indicating one or any combination of movement, rotation and zooming from the series of actions according to the variations of the three-dimensional coordinates;

transmitting the interactive instruction to the computer system, wherein the computer system responds to the interactive instruction for rendering a new image data corresponding to the variations of the three-dimensional coordinates;

receiving the new image data from the computer system and obtaining a new floating image data corresponding to the new image data; and converting the new floating image data to a new floating image to be displayed via the flat display panel through the lens array.

2. The method according to claim 1, wherein the computer system operates a driver that is used to initiate an interface for the computer system to communicate with the floating image display and used to interpret and translate signals exchanged between the computer system and the floating image display.

3. The method according to claim 1, wherein the computer system operates a software procedure that performs a corresponding procedure according to the interactive instruction and the computer system generates the new image data in accordance with the variations of the three-dimensional coordinates.

4. The method according to claim 3, wherein the computer system relies on instructions generated by the software procedure to form the image data or the new image data being provided to the floating image display.

5. The method according to claim 4, wherein the software procedure generates a new instruction in accordance with a gesture operation of a user that causes the computer system to form the new image data being provided to the floating image display.

6. The method according to claim 5, wherein the gesture operation reflects the variations of three-dimensional coordinates of fingers, palm positions and knuckles of a hand, and the interactive instruction indicates the one or any combination of movement, rotation and zooming that causes the software procedure to execute the corresponding procedure.

7. The method according to claim 6, wherein the computer system operates a driver that is used to initiate an interface for the computer system to communicate with the floating image display and used to interpret and translate signals exchanged between the computer system and the floating image display.

8. The method according to claim 7, wherein, according to signals generated from the computer system responding to the interactive instruction, the driver issues a request to an image server for downloading the image data or the new image data that is provided to the floating image display, wherein the color information and three-dimensional space information of the image data are recorded.

9. A floating image display, comprising:
an image processor that processes image data for forming a floating image;
an input interface, electrically connected with the image processor and connected to a gesture sensor, wherein the floating image display receives signals that are generated when the gesture sensor senses a gesture via the input interface, and forms an interactive instruction corresponding to variations of three-dimensional coordinates calculated by the image processor;
a display driving unit electrically connected with the image processor, rendering the floating image according to a floating image data, and using a display unit to display the floating image; and
a computer connection unit electrically connected with the image processor, and connected with a computer device via a communication interface, wherein the computer device operates a computer system, wherein the floating image display is modularized to be installed in the computer device, and the gesture sensor is disposed on the computer device and the gesture sensor is electrically connected with the modularized floating image display;
wherein the floating image display receives image data from the computer system, obtains the floating image data based on the image data, and after the display driving unit converts the floating image data, the display unit displays the floating image via a flat display panel of the floating image display, wherein the flat display panel is used to display an integrated image that is composed by multiple unit images, and the integrated image displayed on the flat display panel is projected to a space at a distance from the flat display panel through a lens array, in which each of the multiple unit images is displayed on the flat display panel through a corresponding lens so as to project the multiple unit images to the space through the lens array for constructing the floating image;
wherein the interactive method using the floating image display includes:
sensing the gesture by the gesture sensor, wherein the gesture sensor continuously tracks a series of actions according to the gesture so as to obtain variations of the three-dimensional coordinates responsive to the gesture;
determining the interactive instruction indicating one or any combination of movement, rotation and zooming from the series of actions according to the variations of the three-dimensional coordinates;
transmitting the interactive instruction to the computer system via the computer connection unit, wherein the computer system responds to the interactive instruction for rendering a new image data corresponding to the variations of the three-dimensional coordinates;
receiving the new image data from the computer system and obtaining a new floating image data corresponding to the new image data; and
converting the new floating image data to a new floating image so as to display the new floating image via the display unit through the lens array.

10. The display according to claim 9, wherein the gesture sensor uses a camera to capture a series of images of key portions of a hand, and an image processing method is performed upon the images for obtaining variations of three-dimensional coordinates of the gesture sensor with respect to each of the key portions within a period of time, and the variations of three-dimensional coordinates of the gesture sensor are converted to the variations of three-dimensional coordinates of the floating image display so as to determine the gesture.

11. The display according to claim 10, wherein the gesture operation reflects the variations of three-dimensional coordinates of fingers, palm positions and knuckles of a hand, and the interactive instruction indicates the one or any combination of movement, rotation and zooming that causes the software procedure to execute a corresponding procedure.

12. The display according to claim 11, wherein the image processor queries image data in a memory unit according to the interactive instruction so as to obtain the floating image data corresponding to the variations of the three-dimensional coordinates; or calculates the floating image data corresponding to the variations of the three-dimensional coordinates in real time.

13. The display according to claim 9, wherein the computer system operates a driver that is used to initiate an interface for the computer system to communicate with the floating image display and used to interpret and translate signals exchanged between the computer system and the floating image display.

14. A floating image display system, comprising:
a floating image display equipped with a gesture sensor, wherein the floating image display is modularized to be installed in a computer device, the gesture sensor is disposed on the computer device and the gesture sensor is electrically connected with the modularized floating image display, wherein the display includes:
an image processor used to process image data that is used to render a floating image and to calculate variations of three-dimensional coordinates for generating an interactive instruction;
an input interface, electrically connected to the image processor and the gesture sensor, used to receive signals generated by the gesture sensor to sense a gesture;
a display driving unit, electrically connected to the image processor, used to obtain the floating image based on a description of a floating image data, and to display the floating image via a display unit; and
a computer connection unit, electrically connected to the image processor, and used to connect with the computer device via a communication interface; wherein the computer device operates a computer system including a driver operated in the computer system; wherein the driver establishes an interface between the computer system and the floating image display for interpreting and translating signals exchanged between the computer system and the floating image display;

wherein the floating image display receives image data from the computer system and renders the floating image data according to the image data, the display driving unit converts the floating image data to the floating image to be displayed on the display unit via a flat display panel of the floating image display, wherein the flat display panel is used to display an integrated image that is composed by multiple unit images, and the integrated image displayed on the flat display panel is projected to a space at a distance from the flat display panel through a lens array, in which each of the multiple unit images is displayed on the flat display panel through a corresponding lens so as to project the multiple unit images to the space through the lens array for constructing the floating image;

wherein an interactive method using the floating image display includes:

sensing the gesture by the gesture sensor, wherein the gesture sensor continuously tracks a series of actions according to the gesture so as to obtain variations of the three-dimensional coordinates responsive to the gesture;

determining the interactive instruction indicating one or any combination of movement, rotation and zooming from the series of actions according to the variations of the three-dimensional coordinates;

transmitting the interactive instruction to the computer system via the computer connection unit, wherein the computer system responds to the interactive instruction for rendering a new image data in accordance with the variations of the three-dimensional coordinates;

receiving the new image data from the computer system and obtaining a new floating image data corresponding to the new image data; and converting the new floating image data to a new floating image so as to display the new floating image via the display unit through the lens array.

15. The system according to claim 14, wherein, according to signals being generated since the computer system responds to the interactive instruction, the driver issues a request to an image server for downloading the image data or the new image data that is provided to the floating image display, wherein the image data records color information and three-dimensional space information.

16. The system according to claim 14, wherein the computer system operates a software procedure that performs a corresponding procedure according to the interactive instruction and the computer system generates the new image data in accordance with the variations of the three-dimensional coordinates.

17. The system according to claim 16, wherein the software procedure receives the interactive instruction formed by the gesture and performs a corresponding procedure according to the interactive instruction, and the computer system renders the new image data being provided to the floating image display according to the interactive instruction.

18. The system according to claim 17, wherein the gesture operation reflects the variations of three-dimensional coordinates of fingers, palm positions and knuckles of a hand, and the interactive instruction indicates the one or any combination of movement, rotation and zooming that causes executing a corresponding software procedure.

19. The system according to claim 18, wherein, according to signals generated from the computer system responding to the interactive instruction, the driver issues a request to an image server for downloading the image data or the new image data that is provided to the floating image display, wherein the color information and three-dimensional space information of the image data are recorded.

* * * * *